United States Patent
Chang et al.

(10) Patent No.: US 9,560,531 B1
(45) Date of Patent: Jan. 31, 2017

(54) JOINT WIRELESS AND FIXED NETWORK OPTIMIZATION FOR HETEROGENEOUS CELLULAR NETWORKS

(71) Applicants: Rui Chu Chang, Plano, TX (US); Ryan Pettijohn, Dallas, TX (US); Hiroyuki Seki, Kamakura (JP); Yasuhiko Aoki, Yokohama (JP)

(72) Inventors: Rui Chu Chang, Plano, TX (US); Ryan Pettijohn, Dallas, TX (US); Hiroyuki Seki, Kamakura (JP); Yasuhiko Aoki, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 14/872,877

(22) Filed: Oct. 1, 2015

(51) Int. Cl.
| | |
|---|---|
| *H04W 16/22* | (2009.01) |
| *H04L 12/24* | (2006.01) |
| *H04W 16/18* | (2009.01) |
| *H04W 16/32* | (2009.01) |
| *H04W 52/18* | (2009.01) |

(52) U.S. Cl.
CPC .............. *H04W 16/22* (2013.01); *H04L 41/12* (2013.01); *H04L 41/147* (2013.01); *H04W 16/18* (2013.01); *H04W 16/32* (2013.01); *H04W 52/18* (2013.01)

(58) Field of Classification Search
None
See application file for complete search history.

(56) References Cited

U.S. PATENT DOCUMENTS

| | | | | |
|---|---|---|---|---|
| 2015/0334653 | A1* | 11/2015 | Ang .................. | H04W 28/0221 370/311 |
| 2015/0365934 | A1* | 12/2015 | Liu ....................... | H04L 5/0039 370/329 |
| 2016/0066261 | A1* | 3/2016 | Nasielski .............. | H04W 48/18 455/406 |
| 2016/0128085 | A1* | 5/2016 | Liu .................... | H04W 72/1273 398/96 |

OTHER PUBLICATIONS

Wikipedia; "C-RAN"; www.wikipedia.org; pp. 5, Aug. 1, 2015.

* cited by examiner

*Primary Examiner* — Diane Mizrahi
(74) *Attorney, Agent, or Firm* — Baker Botts L.L.P.

(57) ABSTRACT

A method and system for joint wireless and fixed network optimization for heterogeneous cellular networks includes performing a feasibility evaluation for an x-haul network comprising at least one of a fronthaul network and a backhaul network, after determining base station locations and radio frequency (RF) parameters. The feasibility evaluation may determine, based on a network graph, which small cell locations are accessible according to actual network demand and based on cost metrics for different types of network links.

10 Claims, 8 Drawing Sheets

500 — X-HAUL DESIGN EXAMPLE: TOPOLOGY

501 — X-HAUL DESIGN EXAMPLE: CANDIDATE X-HAUL DESIGN

JOINT WIRELESS AND FIXED NETWORK OPTIMIZATION FOR HETEROGENEOUS CELLULAR NETWORKS

BACKGROUND

Field of the Disclosure

The present disclosure relates to cellular networking and, specifically, to joint wireless and fixed network optimization for heterogeneous cellular networks.

Description of the Related Art

As cellular networks that provide wireless network access to mobile user devices have been further developed over the years, new generations of cellular networking standards have been implemented about every decade since the first generation (1G) systems were introduced. As each new generation appears, different frequency bands and new transmission technology has enabled higher data rates to be provided via cellular networking.

In a traditional cellular network, such as up to the third generation (3G) systems, radio frequency (RF) components and a fixed network (often an optical network) to link the RF components have typically been viewed as individual and separate systems that may be separately designed and implemented. Underlying this design approach has often been the assumption that, for any given set of traditional cellular RF components, the fixed network would have sufficient throughput capacity to accommodate the resulting bandwidth demand. Furthermore, because such traditional cellular networks have been comprised of so-called "large cells" (including so-called "macrocells" and "microcells") that are relatively few in number, the access to and availability of the fixed network for cell base stations has not generally been a feasibility constraint for a given cellular network design. Therefore, for such a traditional cellular network design, RF engineers could primarily focus on radio considerations to design cell placements and optimal coverage for a given service area.

Advancements in 3G systems have included a distributed base station architecture in which a remote radio head (RRH) was separated from a baseband unit (BBU) in a base station using an optical fiber (or sometimes a microwave link) for more flexible network design and rollout. The network segments that connect standalone RRHs with centralized BBUs at cell locations are referred to as a "fronthaul" network in the distributed base station architecture, while a "backhaul" network refers to the network that interconnects BBUs.

Recently, post-3G cellular network systems have been widely adopted, such as Long Term Evolution (LTE), and continue to grow rapidly. Many new radio access network (RAN) technologies and wireless topologies continue to be developed for LTE, including so-called heterogeneous wireless network architectures that include numerous so-called "small cells" (including so-called "picocells" and "femtocells"). Because the number of small cells in a heterogeneous cellular network may be much larger than the number of large cells in traditional cellular network architectures, heterogeneous designs may be relatively complicated due to the factors of optimal radio coverage with minimal interference and accessibility of each small cell to the fronthaul or backhaul network, among other factors.

Furthermore, new cloud-RAN (C-RAN) cellular wireless network architectures are being used that provide further advantages from implementing LTE-Advanced features, such as Coordinated MultiPoint (CoMP) and Inter-Cell Interference Coordination (ICIC), which rely on inter-cell communication and coordination to improve performance of cells that may provide an economic benefit to the overall cellular network. Because new features such as CoMP, ICIC and Enhanced ICIC (eICIC), rely on very tight timing synchronization, low latency, and very high bandwidth in the wireless domain, certain performance demands on emerging fronthaul networks may approach or exceed those of the backhaul network.

Accordingly, the availability of a suitable fixed network to support emerging cellular network topologies, such as C-RAN, may no longer be a valid assumption for every proposed cell in a given network design. Conversely, RF issues, such as interference, may limit the utilization of high performance fronthaul or backhaul networks (referred to collectively as "x-haul" herein), resulting in wasted network capacity that is economically undesirable.

SUMMARY

In one aspect, a disclosed method is for evaluating cellular networks. The method may include receiving network topology information and base station parameters for a service area of a cellular network. In the method, the network topology information may include locations of base stations associated with the base station parameters and a user density for the service area. In the method, the base stations may include large cells. The method may include determining performance criteria for additional small cells to be added to the service area and determining physical cell constraints associated with the additional small cells. In the method, the performance criteria may specify network performance attributes of an x-haul network for the service area, the x-haul network including at least one of a fronthaul network and a backhaul network. Based on the performance criteria and the physical cell constraints, the method may include generating a plurality of candidate designs for the x-haul network. In the method, the candidate designs may utilize different types of network links for at least some of the x-haul network. The method may also include combining the candidate designs in an x-haul network graph. In the method, the x-haul network graph is a logical data structure that specifies: nodes in the x-haul network including the large cells and the additional small cells, the different types of network links in the x-haul network connecting to the nodes, auxiliary links representing site costs associated with the network links, and a cost metric, respectively, for each of the network links. Based on the x-haul network graph, when the performance criteria and the physical cell constraints are satisfied for each of the additional small cells by at least one of the candidate designs, the method may include outputting the candidate designs satisfying the performance criteria and the physical cell constraints.

In any of the disclosed embodiments of the method, outputting the candidate designs may further include, based on the cost metrics and the site costs, accepting a candidate design output having a lowest cost for the x-haul network. In the method, the site costs may include cost of equipment associated with the network links.

In any of the disclosed embodiments, the method may further include, when the candidate designs output exceed a minimal cost, based on the cost metrics and the site costs specified in the x-haul network graph, outputting an indication that the location for at least some of the additional small cells is rejected.

In any of the disclosed embodiments of the method, the network topology information and the base station parameters may satisfy a utility criteria for the service area. In the method, the utility criteria may be a maximum proportional fair utility indicating that a given throughput is provided to all end users in the service area.

In any of the disclosed embodiments of the method, determining the performance criteria for the additional small cells may further include determining a transmit power for at least one of a large cell and a small cell. In the method, the physical cell constraints may include a line-of-sight constraint for a base station, while the locations of the additional small cells may be specified in 3 dimensions.

In any of the disclosed embodiments of the method, the different types of network links may include at least one of: a wavelength division multiplexed fiber optic link; a passive fiber optical network link; and a wireless link.

In any of the disclosed embodiments of the method, determining the performance criteria for the additional small cells may further include initially simulating the additional small cells in a powered off state, simulating powering on successively more of the additional small cells, beginning with most desirable locations of the additional small cells, simulating interference resulting among the additional small cells simulated as powered on, and, based on the interference, determining an optimal number of the additional small cells in the service area.

Additional disclosed aspects for evaluating feasibility of cellular networks include a computer system having a processor enabled to access a memory media storing instructions executable by the processor.

DESCRIPTION OF PARTICULAR EMBODIMENT(S)

Figure 1:
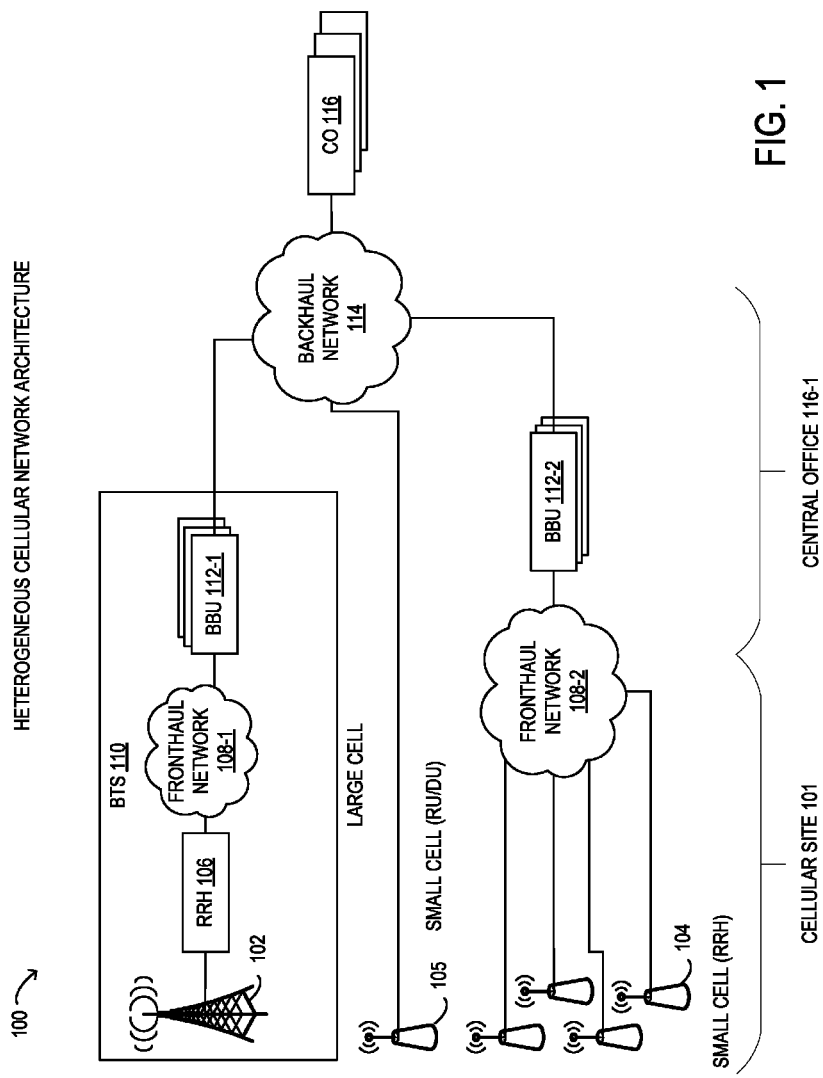
FIG. 1 is a block diagram of selected elements of an embodiment of a heterogeneous cellular network architecture.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

As noted previously, heterogeneous cellular networks include different kinds of cell equipment with different kinds of access topologies. As used herein, large cells include microcells and macrocells, while small cells include pico-cells and femtocells. The different types of cells (or base stations) are summarized in Table 1, which provides an approximate and non-limiting classification for general descriptive purposes.

TABLE 1

Non-limiting classification of cells used as base stations in cellular networks

| Cell Type | Transmit Power | Number of Users per Cell | Provisioning |
|---|---|---|---|
| Femtocell | <50 mW | ~10 | customer |
| Enterprise Femtocell | ~250 mW | ~50 | carrier |
| Picocell | ~2 W | ~100 | carrier |
| Microcell | ~10 W | ~200 | carrier |
| Macrocell | ~50 W | ~500 | carrier |

Furthermore, as C-RAN cellular wireless network architectures become more widespread, LTE-Advanced features, such as CoMP, ICIC and eICIC, subject heterogeneous cellular networks to very tight timing synchronization, low latency, and very high bandwidth in the wireless domain and, in particular, in the fronthaul network. For example, eICIC may involve timing synchronization less than 5 μs, while CoMP may involve delays of less than 1 ms. Because small cells represent a more economic path towards mass scalability of cellular networks, the number of small cells in use is expected to grow exponentially and dominate cellular networking over time. In the future, fifth generation (5G) technology is expected to introduce software-defined networks (SDN) for cellular x-haul networks. The network resource pooling and intelligent resource allocation capabilities from SDN may provide each cellular user with flexible bandwidth allocation, but will be faced with certain challenges in designing and implementing cellular x-haul networks.

In particular, cellular fronthaul networks will be subject to the more stringent performance demands, such that fiber optic links may be a preferable option to connect small cells. However, as the number of locations of small cells increases dramatically, many desired locations, such as lamp posts, utility posts, etc., may not be readily accessible to fiber optics while the cost to extend fiber to such locations may be prohibitive. Another option is microwave connections, which can be extended to both line-of-sight (LOS) and non-line of sight (NLOS) locations, such as below rooftops in buildings, with certain performance constraints.

As a result of the foregoing, the design and rollout of heterogeneous cellular networks will involve consideration of RF signal propagation as well as feasibility of x-haul cellular networking. As will be described herein, optimization of heterogeneous cellular networks may involve various stages. In a first stage, network information is gathered to obtain the 3D geometry of the small cell propagation environment in a service area, which may include both outdoor and indoor environments. In a typical case, the service area will already be serviced by existing macrocells, and in some cases, existing small cells. Thus, optimization of heterogeneous cellular networks, as described herein, will involve adding additional small cells to increase overall capacity or reach of the wireless network. Then, detailed information about user density distribution for the service area may be obtained. For small cell design, the conventional way of estimating user density via existing macrocell's per-sector connection statistics may be insufficiently accurate. The typical macrocell radii are from about 500 to 1500 m, but for small cells, it is desirable to have user density information with resolutions of less than or equal to 50 m (for outdoor) or user density with resolution even finer in each floor of buildings (for indoor). Typical radii of small cells are about 10 to 100 m. For example, a smart phone application that provides accurate global positioning system (GPS) information for each user endpoint device may be a preferred approach to determine the 3D geometry of a service area.

In a second stage, optimizations of small cell radio networks may be performed from the gathered network information in the first step. A set of candidate locations may be selected for installing the additional small cells. As noted, for most cases of heterogeneous cellular networks, the existing macrocell already provides adequate coverage in the service area, such that the additional small cells are primarily added to increase network capacity. For planning purposes, it may be assumed that the additional small cells will carry all capacity for the given service area, relieving the capacity loading from the macrocell to serve other locations. In determining the best location for the additional small cells, several factors may be considered, such as locations and sizes of so called "hot spots" of network demand (areas of high user concentration) and an antenna distance from individual users. However, certain practical limitations may apply for each additional small cell location. Therefore, a semi-automatic approach may be used that enables preferential selection of rooftop locations nearest to the center of a demand hot spot, while enabling design engineers to override the selection and move the small cells to more favorable locations, based on considerations such as access to the x-haul network, zoning constraints, among other factors.

Certain software applications enable automatic or semi-automatic selection of small cell locations. One example is automatically choosing a set of rooftop locations near a desired location as candidates. For more complicated cases, small cell location selection can be done manually. For example, lamp posts or utility posts located at preferred locations may be preferentially selected. The RF optimization (best antenna patterns, optimum 3D orientations, preferred scheduler) may be performed automatically. An RF propagation tool that handles 3D data, such as WinProp (AWE Communications GmBH, Germany), may be used to model the coverage and capacity from certain chosen candidate cells. An optimization tool developed by Fujitsu (Throughput Optimizer) may also be used for RF optimization. The goal of the optimization tool is to evaluate different candidate-cell's 3D locations and optimum RF parameters to obtain the maximum user throughput (peak, average, cell edge). The second stage will accordingly output data that includes 3D locations of small cells in the service area.

Additionally, the second stage may involve selection of optimal RF parameters for the small cell. In some cases, the LTE capability of self-organizing networks (SON) may be used to dynamically optimize many RF parameters such as transmit power, handoff thresholds, etc. However, other RF parameters, such as optimum antenna patterns, frequency bands to be used, optimum scheduling algorithms, may be selected for different performance targets (best overall throughput, best cell edge throughput, optimum fairness, . . . etc.). The Throughput Optimizer is able to select the antenna patterns, preferred frequency bands (if applicable) and scheduling schemes to satisfy desired utility criteria, such as an optimum number of connections or an optimum throughput. For example, one utility criterion is a proportional fair (PF) utility, which is a special case of throughput allocation (TA) utility where each connection is provided the same throughput.

Because RF performance may be limited by interference between cells, it is useful to compare throughput for macrocell and small cell networks that use the same and different frequency channels. In one particular example simulation, it has been observed that when two networks share the same channel, the inter-layer interference is higher and the achieved throughput is lower. In the example simulation, for a shared channel, when the total number of small cells exceeds about 20, the average user end device throughput no longer increases due to increased out-of-cell interference, such that adding more small cells will no longer increase the achieved signal and interference to noise ratio (SINR). In the example simulation, when the two networks are using separate channels, the inter-layer interference is much lower, the average user end device throughput is much higher, and about 40 small cells may be added before the capacity stops increasing. It is noted that the above example simulation represents a singular case and the limits for the number of cells may vary according to many factors. For example, the size of a hot spot may be determinative for the number of small cells. In some cases, the larger the size of the hot spot, the greater the number of small cells that may be added to increase network capacity. Thus, when a hot spot is particularly large in area, a greater number of small cells may be deployed in a productive manner. On the other hand, when the size of a hot spot is relatively small in area, increasing the number of small cells may have little benefit in terms of increasing network capacity.

In a third stage, a feasibility evaluator may receive the data from the second stage and will attempt to design an optimal x-haul network to best accommodate the small cells in the service area. The performance requirements and practical constraints are generally different for small cells than for large cells. For example, when a small cell is RRH then a fronthaul network will be designed with high bandwidth and low latency as performance targets. When a small cell is installed in below-rooftop locations, a LOS propagation condition may not be available, which is a design constraint that will be taken into account. Many possible x-haul technologies may be used, such as: fiber, microwave (NLOS), E-band microwave (LOS), coaxial cables, etc. Different transport technologies will likely be used for different sections (access, aggregation, core) of the network. One goal of the feasibility evaluator is to select the best transport technologies that can satisfy the performance demands and design constraints while minimizing the overall cost.

In a fourth stage, the feasibility evaluator may generate positive or negative feedback based on the results of the design attempt. When the x-haul network can satisfy the requirements of the current small cells, then the overall design goal is attained and a positive feedback is given in completion of the network design. On the other hand, when all options have been exhausted and no x-haul design that satisfies the criteria for all cells is available, then a negative feedback may be provided to the second stage, indicating a change in the locations or numbers of small cells should be attempted. In many cases, moving a small number of cells to different candidate locations may result in a positive feedback and design completion in a second iteration.

Turning now to the drawings, FIG. 1, a block diagram of selected elements of an embodiment of heterogeneous cellular network architecture 100 is depicted. As shown, heterogeneous cellular network architecture 100 depicts certain portions of an exemplary wireless network environment for joint wireless and fixed network optimization for heterogeneous cellular networks, as described herein. Although heterogeneous cellular network architecture 100 shown in FIG. 1 is a cellular network with large cells 102 and small cells 104, 105, as defined herein, it will be understood that various types of cells may be used, including equipment conforming to previous cellular generations. As used herein, as large cell 102 and small cells 104, 105 may represent base stations for a cellular cell. FIG. 1 is a schematic illustration and is not drawn to scale. It is noted that while FIG. 1 is presented in simplified form for descriptive clarity, heterogeneous cellular network architecture 100 may represent or describe very large and very complex cellular networks.

At the right side of heterogeneous cellular network architecture 100, backhaul network 114 is shown providing connectivity between central offices (CO) 116 that may form regional access points. Thus, in some embodiments, backhaul network 114 may be referred to as a core network. More precisely, backhaul network 114 is defined as a fixed network linking BBUs 112 to each other. When the BBUs 112 are co-located within a single CO 116, backhaul network 114 may include local-area network (LAN) segments local to the single CO 116. When the BBUs 112 connected by backhaul network 114 are at different COs 116, backhaul network 114 may include wide-area network (WAN) segments.

At the left side of heterogeneous cellular network architecture 100, further details of a CO 116-1 and cellular site 101 are shown. At CO 116-1, various equipment and connections may be aggregated in different embodiments, for example, to enable different sizes of service areas for CO 116-1. A base station (BTS) 110 is shown as a large cell (macrocell) with a distributed base station architecture, including fronthaul network 108-1, remote radio head (RRH) 106, antenna 102, and BBUs 112-1. As shown, BBUs 112-1 are included with BTS 110, along with fronthaul network 108-1. In various embodiments, CO 116-1 may include a plurality of BBUs 112-1 that may each control one or more base stations, such that BBUs 112-1 are aggregated within CO 116-1. In some embodiments, further aggregation may be performed, such as by using BBU 112 or fronthaul network 108 to service additional instances of BTS 110. In some embodiments, BTS 110 may represent a conventional macrocell in the form of a compact base station. Small cell 105 is shown as a small cell that integrates a radio unit (RU) and a digital unit (DU), such as a femtocell, and having direct access to backhaul network 114 for fixed network connectivity.

Additionally, aggregation is performed at CO 116-1 with BBU 112-2, which represents baseband units to support small cells 104 via fronthaul network 108-2. In various embodiments, fronthaul network 108-2 may represent, or support, the C-RAN architecture. Fronthaul network 108-2 may be a point-point network, a star network, a linear or bus network, or a ring network. Fronthaul network 108-2 may reach up to 10 km in some embodiments. Small cells 104 include RRH and may represent picocells or femtocells.

Figure 2:
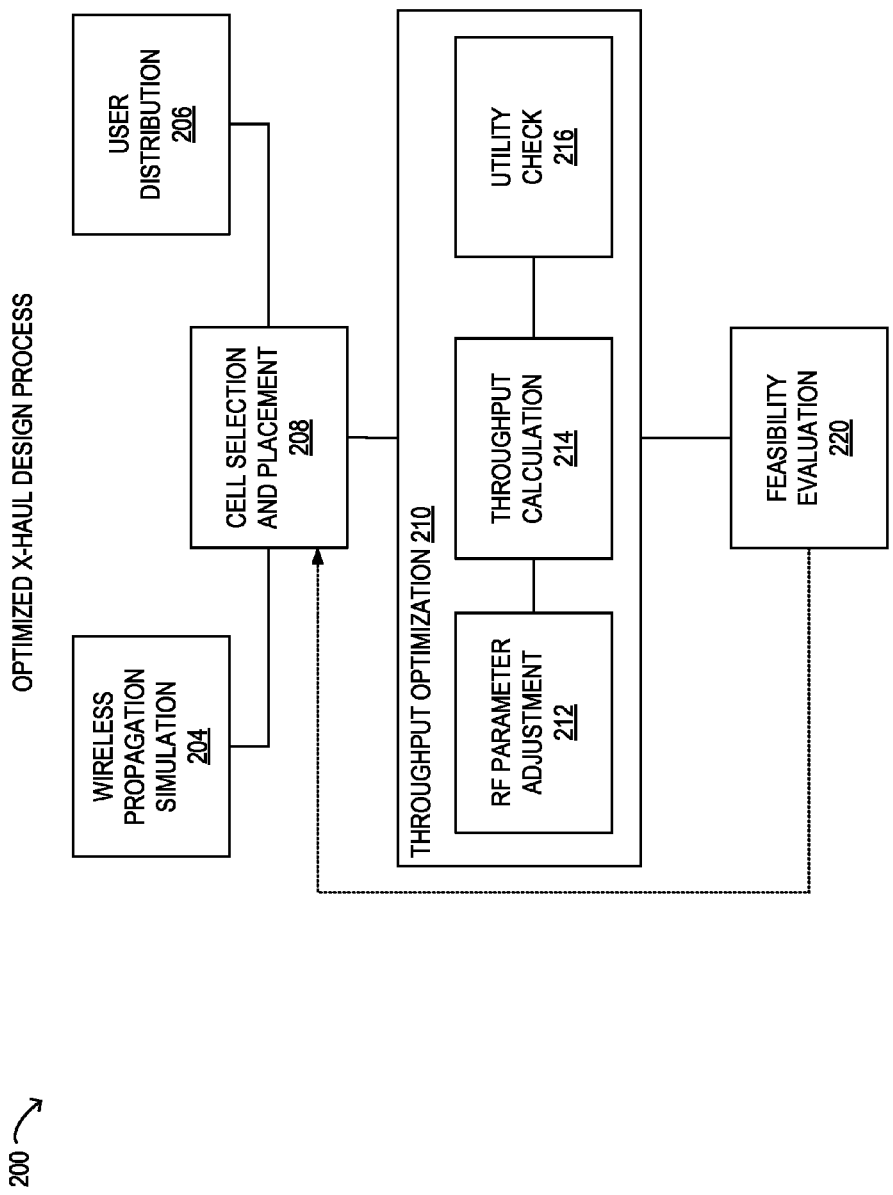
FIG. 2 is a block diagram of selected elements of a joint wireless and fixed network optimization design process.

Referring now to FIG. 2, a block diagram of selected elements of an embodiment of optimized x-haul design process 200 for designing joint wireless and fixed network optimization for heterogeneous cellular networks is shown in flow chart format. It is noted that certain operations depicted in optimized x-haul design process 200 may be rearranged or omitted, as desired. As shown, optimized x-haul design process 200 illustrates the four stages described above.

In optimized x-haul design process 200, geographical information about a service area associated with one or more cell sites may be collected or generated by wireless propagation simulation 204. Wireless propagation simulation 204 may generate simulation data in 3-dimensions for outdoor and indoor locations, including different floors in buildings. The simulation data may include coverage of an existing macrocell wireless network for the service area. User distribution 206 may estimate a user density for the service area and may accordingly output traffic density and other throughput criteria. Then, cell selection and placement 208 may be performed to generate a set of cells, including large cells and small cells, for the service area. The location and type of cell may be specified by cell selection and placement 208. For example, additional small cells may be added at hot spots identified by user distribution 206. In some embodiments, the density of the small cells may be selected to correspond to the user density for a given location or area. In some instances, certain locations in the existing macrocell wireless network may have some areas with weak or no coverage, referred to as 'cold spots', which may be indicated by wireless propagation simulation 204. Cell selection and placement 208 may accordingly add additional small cells in the cold spots identified by wireless propagation simulation 204. Furthermore, cell selection and placement 208 may enable a user to specify certain preferred locations for the additional small cells, such as rooftop locations and atop existing poles or posts, among other locations.

Initially in cell selection and placement 208, the additional small cells may be simulated in a power off state without transmitting power, such that all coverage and capacity originates from the existing macrocell network. Then, some of the additional small cells may be simulated to be turned on in successive iterations, while an improvement in capacity and coverage may be observed. At some stage in cell selection and placement 208, interference between small cells may become so large as to limit the additional gains in capacity from increasing the number of small cells. Beyond this point, adding more small cells may actually result in diminished coverage and capacity. In this manner, cell selection and placement 208 may determine an optimal coverage, or an optical range of coverage, for the additional small cells.

Because cell selection and placement 208 may initially distribute a large number of small cell candidates into the service area, some small cell candidates will be located in more desirable locations than others. For capacity purposes, 'desirable' may be correlated with a distance between a small cell and the center of a hot spot. For coverage purposes, 'desirable' may be correlated with a distance between a small cell and the center of a coverage hole. Alternatively, the user may specify certain locations as being 'desirable' or 'most desirable' or 'preferred'. Then, when cell selection and placement 208 simulates turning on of some small cells, those small cells that are located in the most desirable locations may be turned on first. After the small cells in the most desirable locations are turned on, cell selection and placement 208 may simulate turning on the small cells that are located in the next most desirable locations, and so on.

In certain embodiments, the simulation performed by cell selection and placement 208 may avoid turning on adjacent small cells with a distance that is smaller than a certain value, because two small cells located too close to each other may cause an excessive amount of interference. In particular embodiments, cell selection and placement 208 may be able to simulate turning on small cell candidates with a uniform spatial distribution over the service area.

Then, in optimized x-haul design process 200, throughput optimization 210 may be performed. Throughput optimization 210 may represent an iterative process that iterates over each cell (base station) selected in cell selection and placement 208 as well as over each RF parameter for each base station. For each iteration, RF parameter adjustment 212 may set new RF parameters, throughput calculation 214 may calculate throughput, and utility check 216 may determine a utility criteria. For example, the proportional fair (PF) utility criteria given in Equation 1 may be used.

$$U = \frac{1}{N}\sum_{n=1}^{N} \log(T_n)$$

Equation 1

In Equation 1, U is the PF utility, N is the number of user end devices, and $T_n$ is the throughput for a given user end device n.

Then, corresponding to the third and fourth stages described earlier, feasibility evaluation 200 may be performed to evaluate the performance and economic viability of different technologies for the x-haul network links. When a positive result emerges from feasibility evaluation 220, different candidate designs for the x-haul network may be generated and evaluated, such as based on cost. Then, an optimal design for the x-haul network may be selected. When no positive result emerges from feasibility evaluation 220, an indication that the location of at least some of the base stations, in particular small cells, was rejected may be generated and sent to cell selection and placement 208, as indicated by the dashed line arrow.

Figure 3:
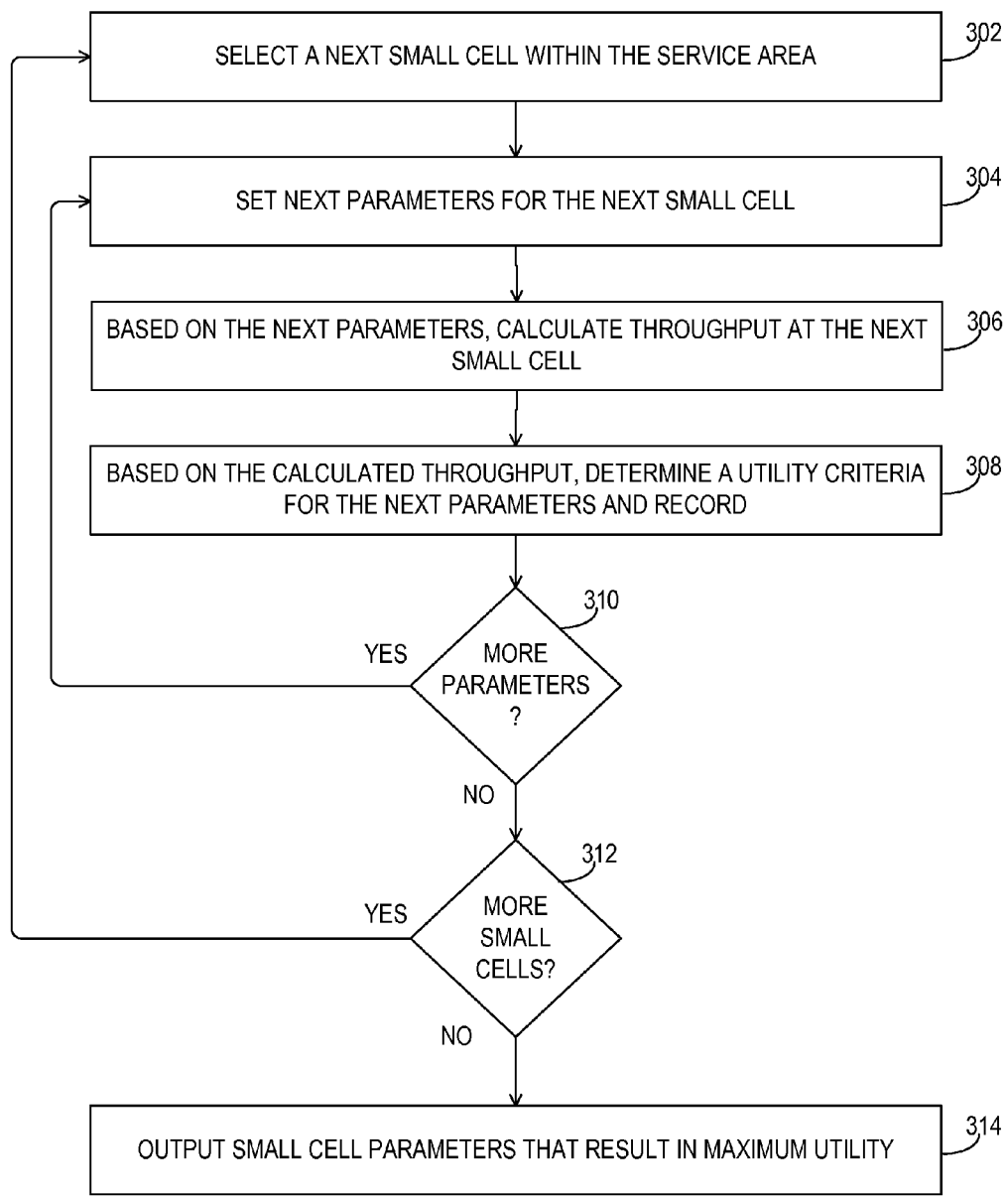
FIG. 3 is a flowchart depicting selected elements of an embodiment of a method for throughput optimization.

Turning now to FIG. 3, a block diagram of selected elements of an embodiment of method 210 for throughput optimization is shown in flow chart format. It is noted that certain operations depicted in method 210 may be rearranged or omitted, as desired. Method 210 corresponds to throughput optimization 210 in FIG. 2.

Method 210 may begin at step 302 by selecting a next small cell in the service area. The next small cell may be selected from the additional small cells generated by cell selection and placement 208, as described above. Then, at step 304, next parameters may be selected for the next small cell. Based on the next parameters, at step 306, a throughput at the next small cell may be calculated. Based on the calculated throughput, at step 308, a utility for the next parameters may be determined and stored. At step 310 a decision may be made whether more parameters remain to be evaluated. When more parameters remain to be evaluated, the result of step 310 is YES, and method 210 may loop back to step 304. When no more parameters remain to be evaluated, the result of step 310 is NO, and a decision may be made at step 312 whether more small cells remain to be evaluated. When more small cells remain to be evaluated, the result of step 312 is YES, and method 210 may loop back to step 302. When no more small cells remain to be evaluated, the result of step 312 is NO, and, at step 314, base station parameters that result in maximum utility may be output.

Figure 4:
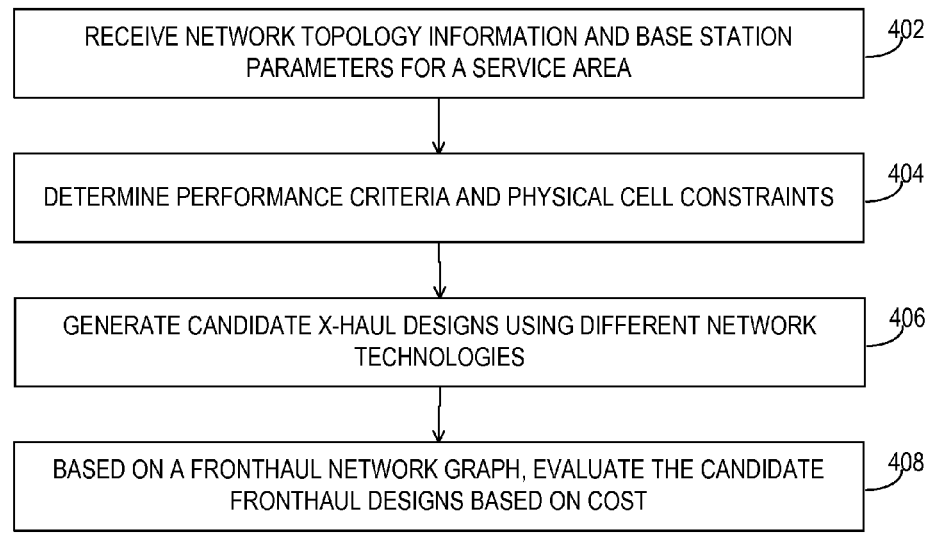
FIG. 4 is a flowchart depicting selected elements of an embodiment of a method for feasibility evaluation.

Turning now to FIG. 4, a block diagram of selected elements of an embodiment of method 220 for x-haul feasibility evaluation is shown in flow chart format. It is noted that certain operations depicted in method 220 may be rearranged or omitted, as desired. Method 220 corresponds to feasibility evaluation 220 in FIG. 2.

Method 220 may begin at step 402 by receiving network topology information and base station parameters for a service area. The network topology information may include respective locations in 3D of large cells and small cells and a user density for the service area. The small cells may be selected from the additional small cells generated by cell selection and placement 208, as described above. At step 404, performance criteria and physical cell constraints may be determined. The performance criteria may specify network performance attributes of an x-haul network for the service area. At step 406, candidate x-haul designs using different network technologies may be generated. The different network technologies may employ different types of network links for at least some of the x-haul network. At step 408, based on a x-haul network graph, the candidate x-haul designs may be evaluated based on cost. The x-haul network graph may include a combination of the candidate fronthaul or backhaul designs. The x-haul network graph may specify the different types of network links in the x-haul network. The x-haul network graph may specify auxiliary links representing site costs associated with the network links. The site costs may include cost of equipment associated with the network links, as well as costs for the cell site, such as a rental fee. The x-haul network graph may specify a cost metric for each of the network links.

After step 408, various different criteria and evaluations may be performed, in different embodiments. For example, when the performance criteria and the physical cell constraints are satisfied for each of the base stations by at least one of the candidate designs, the candidate designs satisfying the performance criteria and the physical cell constraints may be output, representing a positive outcome. Then, based on the cost metrics and the site costs, the candidate design having a lowest cost for the x-haul network may be selected or accepted. In some embodiments, when all the candidate designs output exceed a minimal cost, an indication that the location for at least some of the base stations is rejected may be output. In some instances, the individual base stations whose location is rejected may be identified.

Referring now to FIGS. 5A, 5B, 5C, 5D and 6, an example of joint wireless and fixed network optimization design for a heterogeneous cellular network will now be described in further detail. The example below is based on FIGS. 1-4 described above.

Figure 5A:
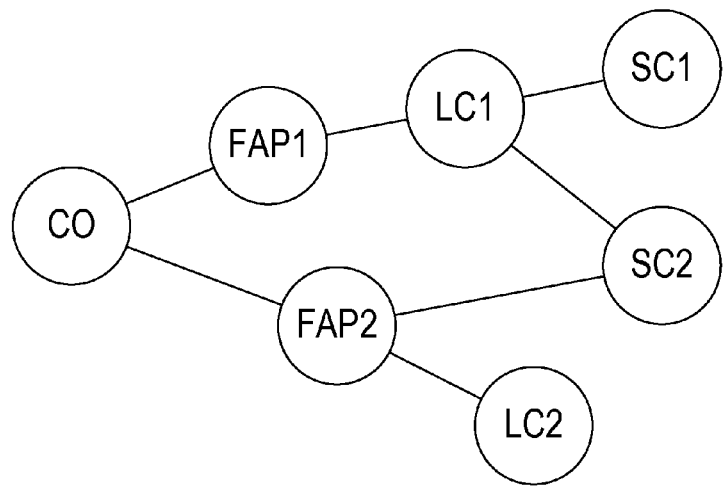
FIG. 5A is a network topology of selected elements of an x-haul design example.

In FIG. 5A, topology 500 describes a service area for which an x-haul network design is to be optimized in the example. Topology 500 is based on site locations, equipment, and link technologies, and includes central office CO, fiber access point 1 FAP1, fiber access point 2 FAP2, large cell 1 LC1, large cell 2 LC2, small cell 1 SC1, and small cell 2 SC2. Further details of topology 500 will be revealed in the following description of the example, in which different types of network links are selected in different candidate designs. For each network link selected, the corresponding equipment is chosen and a cost metric for each network link is calculated.

Figure 5B:
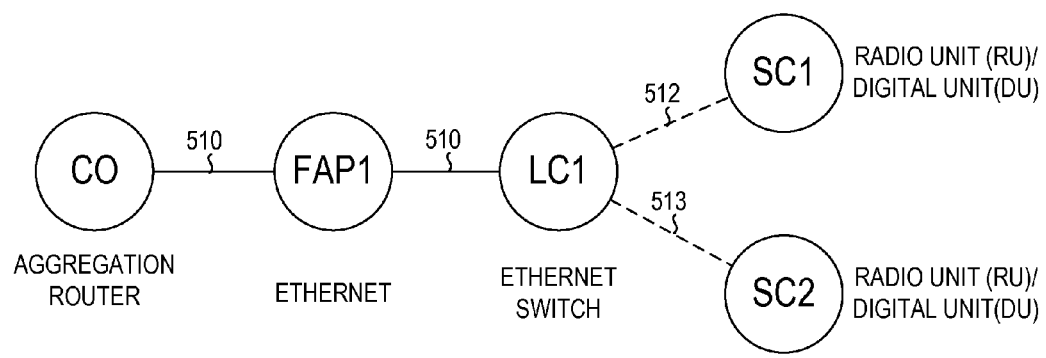
FIGS. 5B, 5C, and 5D are a network topologies of selected elements of candidate x-haul designs in an x-haul design example.

In FIG. 5B, a candidate x-haul design 501 for connecting SC1 and SC2 to CO is illustrated. In candidate x-haul design 501, network links 510 are chosen as fiber optic Ethernet links that link an aggregation router at CO with an Ethernet switch at LC1 via FAP1. Network links 512, 513 represent wireless links (dashed lines) from LC1, which includes a corresponding digital unit (DU)/radio unit (RU). In some embodiments, network links 512, 513 are microwave links. In other embodiments, network links 512, 513 may be sub-6

GHz wireless links. In candidate x-haul design 501, SC1 and SC2 include the respective RU/DU to communicate with LC1 wirelessly.

Figure 5C:
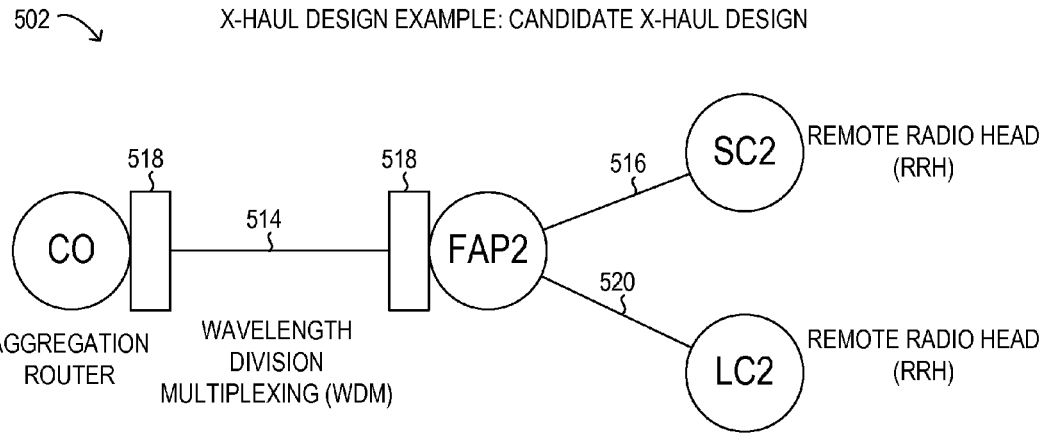
Figure 5D:
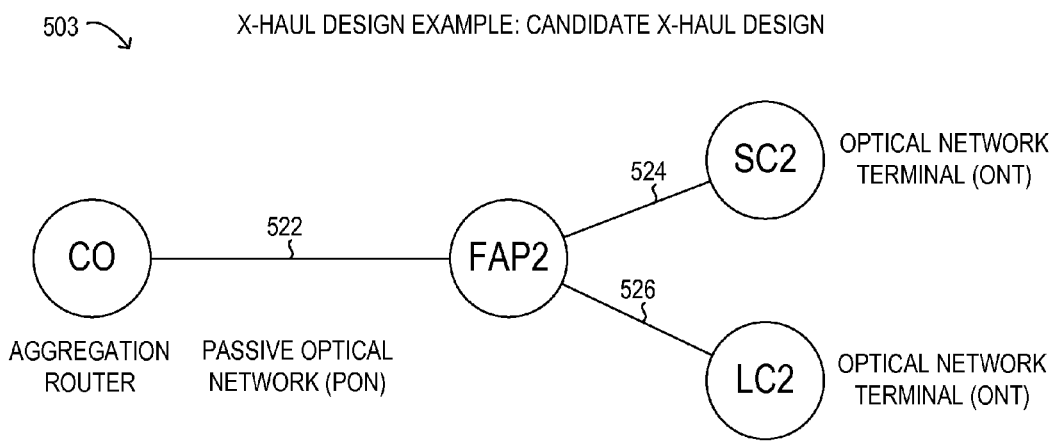

In FIGS. 5C and 5D, candidate x-haul designs 502 and 503 for connecting SC2 and LC2 to CO are illustrated.

In candidate x-haul design 502, network link 514 is a WDM optical signal with corresponding mux/demux 518 at either end for bidirectional operation. Network link 514 may utilize Common Public Radio Interface (CPRI). Network links 516, 520 may be fiber optic links using CPRI, while SC2 and LC2 are RRH and have a corresponding BBU (not shown) at CO.

In candidate x-haul design 503, network link 522 is a passive optical network (PON) link having an optical line terminal (OLT) (not shown) at CO and which is split at FAP2 into network links 524, 526, which are also PON. SC2 and LC2 are optical network terminals (ONT) for the PON.

Figure 6:
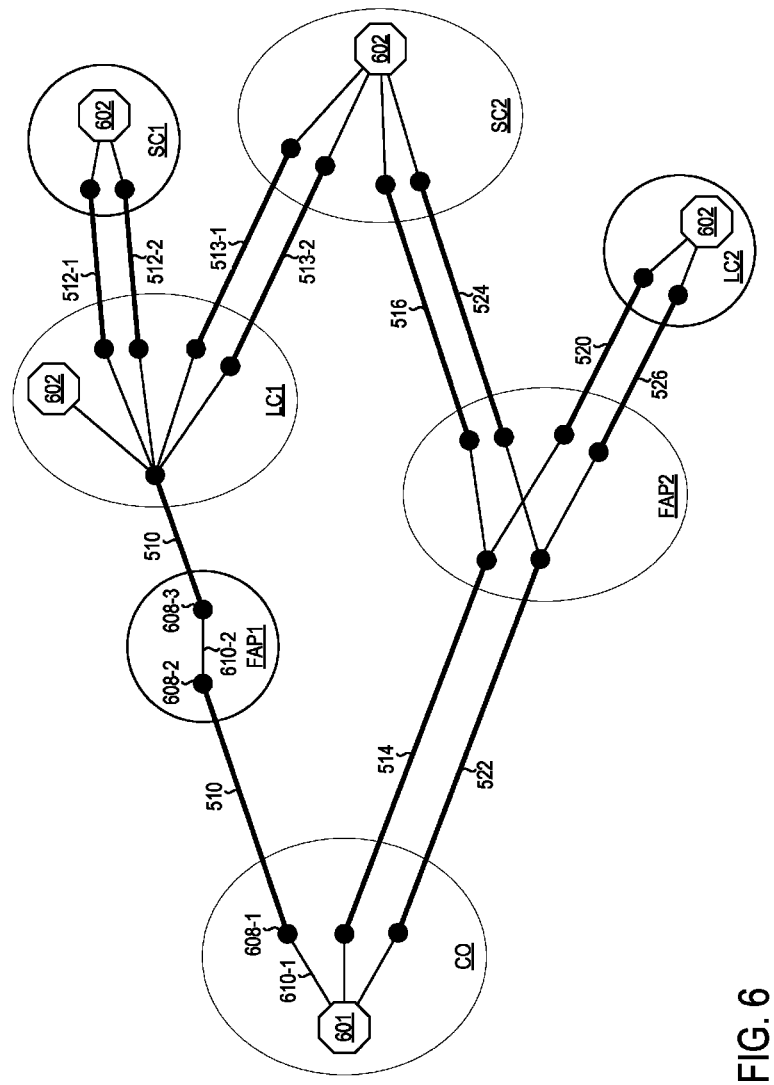
FIG. 6 is an x-haul network graph depicting selected elements of candidate x-haul designs in an x-haul design example.

In FIG. 6, x-haul network graph 600 illustrates a combination of embodiments of designs 501, 502, 503. In x-haul network graph 600, octagon 601 represents a traffic termination point for CO, while octagons 602 represent traffic termination points for LC1, LC2, SC1, and SC 2, respectively. The traffic termination point 601 corresponds to the aggregation router (AR) and traffic termination points 602 in a cell site correspond to the air interface for cellular users.

The network links from designs 501, 502, 503 are shown in FIG. 6 as thick lines between nodes. Within each node and for each network link, a black dot 608 is used to add auxiliary links 610 to provide additional cost information for cost of equipment and site costs. Thus, for example, auxiliary link 610-1 represents costs at CO for network link 510 terminating at 608-1 (fiber optic Ethernet), while auxiliary link 610-2 is the cost for network link 510 at FAP1 that extends via 608-2 and 608-3. The remaining auxiliary links and connections are not numbered for descriptive clarity, but it will be understood that each network link has an auxiliary link at each node, respectively. The auxiliary links are added in such a way that the resulting paths are feasible. For example, there is no auxiliary link added between CPRI and PON in FAP2. It is noted that the auxiliary links may be unidirectional even though actual network traffic is bidirectional, in order to prevent unrealistic solutions in the path evaluation, such as SC1-LC1-SC2-FAP2-CO.

Network link 512-1, 513-1 represent microwave links, while network links 512-2, 513-2 represent sub-6 GHz wireless links. Based on x-haul network graph 600, a cost calculation may be performed and evaluated for the different network links that are available.

Each network link between nodes represents one candidate transmission technology, and is associated with a cost and available capacity of the corresponding technology. There may be multiple links between nodes if there are multiple technology candidates, such as shown between CO and FAP2, among others.

The minimum-cost path can be found by finding the minimum cost path from a cell site to CO using x-haul network graph 600. Prior to path search for each demand, network links with insufficient capacity for the demand may be deactivated. In addition, the network links connected to air interface traffic termination point 602 are also deactivated when the cell cannot support the requested bandwidth. The available capacity of network links and nodes is decreased after each demand is assigned to a path. For example, in x-haul network graph 600, the route given by network links 522 and 524 may provide the lowest cost solution for a demand between SC2 and CO, which uses fiber-based PON rather than CPRI or Ethernet technology.

Figure 7:
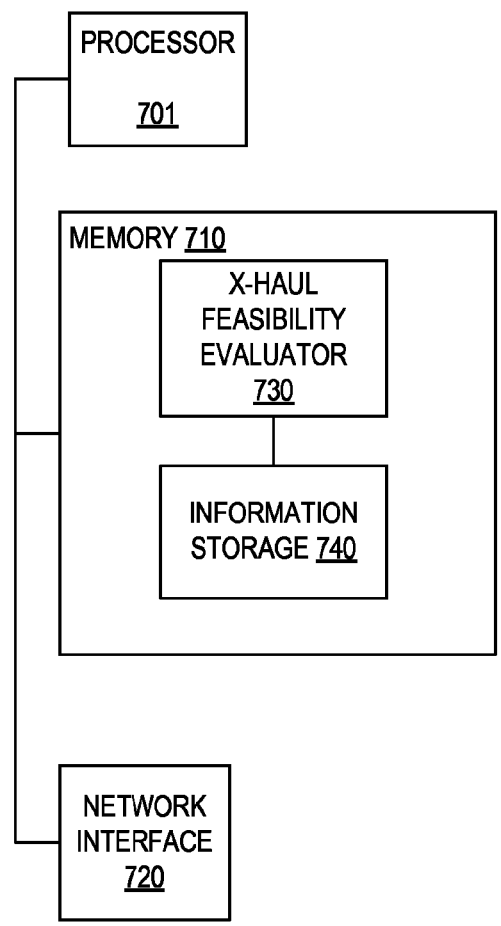
FIG. 7 is a block diagram of selected elements of a computer system.

Referring now to FIG. 7, a block diagram of selected elements of an embodiment of a computer system 700 is illustrated. In FIG. 7, computer system 700 includes physical and logical components for implementing at least certain portions of joint wireless and fixed network optimization design process 200, as described herein, and may accordingly include processor 701, memory 710, and network interface 720. Processor 701 may represent one or more individual processing units and may execute program instructions, interpret data, process data stored by memory 710 or computer system 700.

In FIG. 7, memory 710 may be communicatively coupled to processor 701 and may comprise a system, device, or apparatus suitable to retain program instructions and data for a period of time (e.g., computer-readable media). Memory 710 may include various types components and devices, such as random access memory (RAM), electrically erasable programmable read-only memory (EEPROM), a memory card, flash memory, solid state disks, hard disk drives, magnetic tape libraries, optical disk drives, magneto-optical disk drives, compact disk drives, compact disk arrays, disk array controllers, or any suitable selection or array of volatile or non-volatile memory. Non-volatile memory refers to a memory that retains data after power is turned off. It is noted that memory 710 may include different numbers of physical storage devices, in various embodiments.

As shown in FIG. 7, memory 710 may include x-haul feasibility evaluator 730, which may represent instructions executable by processor 701 to implement or perform tasks associated with optimized x-haul design process 200, or more specifically, with feasibility evaluation 220, as described above. Information storage 740 may store various data and parameters, such as data and parameters associated joint wireless and fixed network optimization for heterogeneous cellular networks, as described herein.

As disclosed herein, a method and system for joint wireless and fixed network optimization for heterogeneous cellular networks includes performing a feasibility evaluation for an x-haul network comprising at least one of a fronthaul network and a backhaul network, after determining base station locations and RF parameters. The feasibility evaluation may determine, based on a network graph, which small cell locations are accessible according to actual network demand and based on cost metrics for different types of network links.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A computer system for evaluating cellular networks, comprising:
a processor enabled to access a memory media storing instructions executable by the processor to:
receive network topology information and base station parameters for a service area of a cellular network, wherein the network topology information includes locations of base stations associated with the base station parameters and a user density for the service area, and wherein the base stations include large cells;

determine performance criteria for additional small cells to be added to the service area, wherein the performance criteria specify network performance attributes of an x-haul network for the service area, the x-haul network including at least one of a fronthaul network and a backhaul network;

determine physical cell constraints associated with the additional small cells;

based on the performance criteria and the physical cell constraints, generating a plurality of candidate designs for the x-haul network, wherein the candidate designs utilize different types of network links for at least some of the x-haul network;

combine the candidate designs in an x-haul network graph, wherein the x-haul network graph is a logical data structure that specifies:
  nodes in the x-haul network including the large cells and the additional small cells;
  the different types of network links in the x-haul network connecting to the nodes;
  auxiliary links representing site costs associated with the nodes; and
  a cost metric for each of the network links; and based on the x-haul network graph, when the performance criteria and the physical cell constraints are satisfied for each of the base stations by at least one of the candidate designs, output the candidate designs satisfying the performance criteria and the physical cell constraints.

2. The computer system of claim 1, wherein the instructions to output the candidate designs further comprise instructions to:
  based on the cost metrics and the site costs, accept a candidate design output having a lowest cost for the x-haul network.

3. The computer system of claim 1, wherein the site costs include cost of equipment associated with the network links.

4. The computer system of claim 1, wherein the memory media further comprises instructions to:
  when the candidate designs output exceed a minimal cost, based on the cost metrics and the site costs, output an indication that the location for at least some of the additional small cells is rejected.

5. The computer system of claim 1, wherein the network topology information and the base station parameters satisfy a utility criteria for the service area.

6. The computer system of claim 5, wherein the utility criteria is a maximum proportional fair utility indicating that a given throughput is provided to all end users in the service area.

7. The computer system of claim 1, wherein the instructions to determine the performance criteria for the additional small cells further comprise instructions to:
  determine a transmit power for at least one of a large cell and a small cell.

8. The computer system of claim 1, wherein the physical cell constraints include a line-of-sight constraint for a small cell, and wherein the locations of the additional small cells are specified in 3 dimensions.

9. The computer system of claim 1, wherein the different types of network links include at least one of:
  a wavelength division multiplexed fiber optic link;
  a passive fiber optical network link; and
  a wireless link.

10. The computer system of claim 1, wherein the instructions to determine the performance criteria for the additional small cells further comprise instructions to:
  initially simulate the additional small cells in a powered off state;
  simulate powering on successively more of the additional small cells, beginning with most desirable locations of the additional small cells;
  simulate interference resulting among the additional small cells simulated as powered on; and
  based on the interference, determine an optimal number of the additional small cells in the service area.

* * * * *